L. W. BATES.
FUEL AND METHOD OF PRODUCING SAME.
APPLICATION FILED MAR. 23, 1920.

1,390,231.

Patented Sept. 6, 1921.

Inventor:
Lindon W. Bates,
by Dodge and Sons,
Attorneys.

UNITED STATES PATENT OFFICE.

LINDON WALLACE BATES, OF MOUNT LEBANON, NEW YORK.

FUEL AND METHOD OF PRODUCING SAME.

1,390,231.          Specification of Letters Patent.          Patented Sept. 6, 1921.

Application filed March 23, 1920. Serial No. 368,136.

*To all whom it may concern:*

Be it known that I, LINDON W. BATES, a citizen of the United States, residing at Mount Lebanon, in the county of Columbia and State of New York, have invented certain new and useful Improvements in Fuel and Methods of Producing Same, of which the following is a specification.

This invention pertains to an improved method of producing a stable mobile fuel, in the form of a liquid, paste or gel, consisting in effecting an admixture of combustible liquid and pulverized solid carbonaceous substance and simultaneously therewith removing ash or other impurities from the carbonaceous substance. The method utilizes flotation principles, adapted to the special circumstances, as a series of steps in the stabilizing or colloidalizing process.

The colloidalizing process, in those aspects which are relevant hereto, consists essentially in the use of certain substances and treatments to promote the stability of carbonaceous particles in combustible liquid. By "stability" is meant neither absolute stability nor simply slow natural sedimentation, but relative stability or artificially delayed separation such that the composite may be used practically as a liquid or mobile fuel. The stabilizing substances affecting carbonaceous particles are "fixateurs" or peptizers. Representative or typical of the first class is resinate of calcium. Other soaps or substances generically similar will be found to serve as equivalents. Creosote and water gas tar are examples of the peptizers of carbonaceous substances having stabilizing capacities. The peptizers are usually coal derivatives or distillates from the steam distillation or destructive distillation of coals, which term includes like carbonaceous substances such as peat and lignite, and other solid carbons. Certain gases possess in some measure the peptizing quality. The peptizer may be a solid which liquefies under heat. Buoyant substances may also be employed on a suitable occasion to promote stability. The stabilizing substances or protecting agents are not all equally effective, but will produce adequate stability under proper conditions of application. The stabilizing treatment consists in mechanical blending, or in the application of heat, or in a combination of these measures. Mechanical agitation alone will suffice to stabilize particles when a fixateur is included in the fuel. The combined treatment is useful if a peptizer is employed, as heat brings out or accelerates the reaction. It is also assisted by lapse of time in storage and by agitation. When rapid peptization is desired heat is essential. Usually a temperature of from 65° C. to 95° C. is applied for two hours or thereabout, which may be shorter if mechanical agitation is also used. Lower temperature calls for longer application and higher temperature shorter application.

In regard to the amount of stabilizing substance, it is found that from $\frac{1}{2}\%$ to $1\frac{1}{2}\%$ of rosin in resinate of calcium grease, the percentage being by weight of the total fuel, will suffice to give adequate stability to a liquid fuel containing up to about 35% of carbonaceous particles. Over 2% is rarely used, while under $\frac{1}{4}\%$ has a perceptible effect. About half the amount of lime or other alkali will form therewith a good fixateur. If a peptizer is employed the amount of fixateur may be less than when fixateur alone is employed. Of peptizer alone, from 5% to 20% by weight of the total fuel is used, but the amount may fall below or exceed these figures. When a peptizer is used which is immiscible with the dispersion medium, as coal tar with respect to mineral oil, less carbonaceous particles can usually be stabilized than when a miscible peptizer is used. The proportion of necessary peptizer varies with its activity as a peptizer, its miscibility with the dispersion medium, the percentage of volatile matter and the quantity of solid carbonaceous material to be used in the fuel, number of particles and other factors. Thus, less creosote is required than water gas tar to stabilize equal amounts of coal, as the former is more active as a peptizer.

The art of stabilizing particles of carbonaceous substance in liquid hydrocarbon is too recent to admit of precise scientific explanation of the phenomena that obtain. In fact chemists and physicists still disagree concerning the nature of the reactions in the now mature flotation art. With due reserve, therefore, one may indicate in broad outline the meaning given or attached to the terms used. Zsigmondy's definition of peptization is adopted and by a peptizer is meant in the colloidalizing art a substance which partially dissolves a particle, spongifies it somewhat and penetrates into seams, pores and cavities or creates them and so penetrates. An aspect of the reaction is somewhat analogous to occlusion and absorption and there is no doubt also adsorption of the peptizer and particle. The particle is thereby stabilized, and the rate of natural sedimentation more or less modified. Whether the result is due to change of surface tension, introduction of electrical factors, increase of buoyancy, or alteration of specific gravity to produce equilibrium is premature to say and unnecessary on this occasion. The fixateurs give adequate stability apparently without spongifying. Reduction in particle size beyond 200 mesh is not a primary consideration and in any event neither agent reduces the bulk of the particles to colloidal size to attain stability. The two classes of stabilizing substances are distinguished at the present stage of the new art, but there are no doubt points of similarity in their operation upon particles as well as differences.

Up to about 40% by weight of carbonaceous particles may be carried in suspense in a liquid fuel and more in a mobile paste. The fuel so formed, containing over about 10% of solid particles by weight of total fuel, according to specific gravity, will be heavier than water. Paste containing percentages of coal up to about 65% by weight will still be mobile and much heavier than water. The type of fuel of density greater than fresh and salt water is preferred and to produce it is the principal object of this process. Such fuel may be stored under a water seal which forms a permanent layer of water upon its top surface during the period of storage and stability. The fuel usually enjoys also greater calorific value per unit volume than equal volumes of any ingredient.

"Flotation" is a broad term and embraces several different systems. In the present process use is made of that flotation principle featuring the preferential affinity of oil for coal over ash to form in water a froth by agitation and aeration, from which froth ash separates. The oils used in minerals flotation are divided for convenience into "frothers" and "collectors." The mineral oils are usually good frothers, while the coal distillates are the best collectors. The common frothers are chiefly products of the distillation of wood, such as pine-oil, pine-creosote, hardwood-creosote, turpentine, and resin-oil, as well as certain coal tar fractions, like phenol, cresol and the tar acids. The common collectors are coal tar, coal-creosote, pine-tar, hardwood-tar, crude petroleum and many of its fractions. Many oils, such as eucalyptus-oil and pine-oil serve both as collectors and frothers. As a rule the frothers are either soluble in water to a limited extent or form therewith colloidal emulsions. The collectors are not soluble or are less soluble than the frothers in water. It is a fortunate coincidence that some of the oils usable in the flotation process also serve as peptizers in the colloidalizing process and that certain oils usable in the flotation process as frothers form with alkali a suitable soap.

Heretofore in minerals flotation the effort has been to use the least oil possible, since the flotation oil has to be driven off before the mineral is smelted. Now, however, a fuel comprising a considerable body of oil is to be made with the purified coal, so the same necessity does not exist in this modification of the flotation process. A froth may be formed with any reasonable amount of oil if the agitation and aeration are adjusted thereto. To make a froth, Eveson used oil in an amount from 5% to 17% of the weight of the ore treated, and Froment from 1% to 3½%, according to the mineral content of the ore. Cattermole used oil from 4% to 6% of the weight of the metalliferous mineral matter present in the ore to make granules that sink. Sulman, Picard and Ballott used less oil than 1% of the weight of the ore with violent agitation to make a persistent froth. More recent experience has shown that thirty-two pounds of oil per ton of ore will make as good a froth as two to four pounds, and froth may be produced using up to 25% of oil by weight of ore. ("*Flotation*," T. A. Ricard and O. B. Rolston, 1916, page 125). Inasmuch as in the present process the oil is to be used not only for flotation but also for peptization of the large amount of coal present in the impure material treated, the percentage of oil should exceed 1% of the weight of the carbonaceous material treated. Less than 1% may be used, but the combination process will not be as economic. Even such small amounts will peptize particles. The precise amount in excess of 1% should be such amount as will produce a proper froth, which will peptize somewhat the carbonaceous particles and which will increase the grinding efficiency in the mill. The amount will vary according to circumstances, and should be adjusted to the agitation and aeration. A suitable flotation oil, which will also peptize the coal in a fuel containing about 30% by weight of particles, consists for example of 3% coal creosote and 2% mineral oil, the percentage being by weight of the total fuel product. It is not necessary that all the flotation oil should be a peptizer. Nor is it necessary that all the peptizer needed to stabilize the coal be added thereto prior to flotation. The peptizing portion of the flotation oil may be itself a composite. For example creosote may be combined with water gas tar or either of these with coal-tar. As peptization takes time it is essential to the process that some peptizing substance be employed at the earliest possible moment, before flotation and during it, so as to begin the stabilization treatment from the outset.

Bituminous coals and lignites as they contain more volatiles lend themselves more readily than anthracite or coke to peptization. The process may be applied to coals of high ash or impurities-content or low content. Several varieties of carbonaceous substance may be simultaneously de-ashed and treated, and it is not necessary that all of the coal be peptized in the mill or that the peptization therein be carried to the desired degree for eventual fuel stability. It is possible to remove by flotation most of the ash content of coals. Coals containing 25% ash content in the material treated may be handled economically, but the process is not limited to such amounts. Many of the large culm banks, river deposits and waste heaps of coal may be usefully treated, since important amounts of sand, silica, earthy materials, slate and rock are usually present associated with good coal. The coal carried down stream by river water may be collected and treated. Mined coals from the poorer veins admit also of useful de-ashing. Impurities, such as pyrites, which may be removed to some extent by washing the coal in an agitating vessel with water, or otherwise, should of course be removed if possible, as sulfids will tend to float in the froth with the coal. Selective flotation and electrolytic measures to separate ash or coals may also be employed. The term "ash" is deemed to embrace impurities generally and "coal" suitable carbonaceous substance.

The initial step in the combined flotation and colloidalizing process consists in the grinding of the coal in a suitable pulverizing mill. The better the flotation oil is distributed through the pulp the more effective is the forth. The oil added to the coal in the mill should serve for flotation purposes and for peptization as heretofore indicated. Some of the oil used in the mill should be a peptizer, frother and collector, to perform the desired functions. It is better for present purposes that the coal be ground in oil then dry or in water alone. If no froth prejudicial to grinding is made other liquid may be added in the mill. To obtain grinding efficiency the liquid in the mill should be thin. If the oil to be used for flotation is viscous, heat will reduce its viscosity to the degree suitable for grinding. In the heated mill a ratio of coal two oil one will serve, but other ratios may be used. At normal temperatures equal ratios of coal and oil are advantageous. It is not necessary that all the oil used in the mill should be also used for flotation. Thus oil may be removed from the pulverized coal by centrifuging or otherwise. The centrifuged oil constitutes a fuel containing the smallest coal particles. It may be used over again in the mill or as a stable liquid fuel for internal combustion engines. The impure coal passes with its remaining associated oil to the agitation vessel for froth flotation. This procedure is advantageous since coal and considerable amounts of oil give the best grinding efficiency while smaller amounts of oil give the best froth.

When solid carbonaceous material such as coal is pulverized in an ordinary ball or tube mill the lumps or pieces are broken up into particles, each of which is a miniature lump of coal, having initially pointed edges and clean, bright surfaces. But the peptizing hydrocarbon in the mill associates with the particles upon fracture and acts to partially dissolve, spongify, pit and cavitate. The particles, therefore, before flotation proceeds undergo a change in surface condition, in which the oil associates with the coal before the water can do so and in a fashion which does not prejudice flotation for present purposes and which prepares the particles for eventual stability in liquid fuel. In minerals, separation reduction to pass a 16 mesh screen is frequent, but material passing 200 mesh screen may be used. For stabilization, however, the material should for the most part pass a 200 mesh screen. The carbonaceous substance should be mainly reduced therefore to the latter size either before flotation or after it. Most of the particles which pass a 200 mesh screen are greatly above colloidal dimensions.

In view of the comparatively short time in which the coal is in a pulverizing mill, it is useful to heat the mixture therein to bring out or accelerate the peptization reaction or phenomenon during the reduction of the material. The heat should be between 65° C. and 95° C., lower heat requiring longer exposure and higher heat shorter exposure to produce due peptization. Some peptizers are inactive at normal temperature or are less active at normal temperature than at higher temperature. The peptizing quality may be latent to be brought out by heat. Thus pyridin and solvent naphtha tars are fair peptizers at 20° C., creosote is less active, water gas tar still less, and coal tar almost inactive. But heat applied sufficiently and long enough will induce the least active of these to properly peptize suitable coal. Even high heat in the mill may not suffice to complete the peptization to the degree desired for fuel stability, and on the other hand, over peptization is to be avoided for this purpose as stability is thereby prejudiced or reduced in degree and duration or the viscosity of the mixture is unduly increased. Peptization may be continued during the process of flotation or the treatment renewed after the actual flotation step has been completed. There can in the nature of things be no hard and fast rule or formula, but the indications given will suffice to enable the requisite treatment to be applied to a particular case.

The second step of the combined process consists in the application of flotation to the pulp formed in the mill. The froth formation takes place in a vessel filled with water. Water is used because the prime requisite for a sufficient froth is a variable surface tension. Water has a surface tension of 71.8 dynes per centimeter, while mineral oils have about 23, kerosene 25.2 and pine-oil 30. Oil lowers the surface tension of water and makes it variable. Water is a convenient liquid for flotation work because it has a surface tension so high that the addition of almost any other liquid will lower and vary it. Other liquids having suitable surface tension and qualities may be employed. A suitable ratio of water to material treated is ten to one, but other ratios are possible. The mixture, a pulp, is conveyed into the agitation vessel and is agitated and aerated until a froth is formed of such consistency that the coal is carried to the surface in satisfactory quantities. There are numerous ways of agitating the pulp and of aerating it. By "aeration" is not necessarily meant the use of air, for any gas will serve the flotation purpose if sufficiently buoyant. As air is the preferred gas the word "air" will be used hereafter in the sense of including equivalent gases. The agitating apparatus may be used to beat air into the pulp, as in the minerals separation process of Sulman, Picard and Ballott, or air may be admitted specially. For present purposes it is found convenient both to agitate mechanically and to introduce air from outside. This accelerates the froth formation and facilitates the flotation operation. The process is not limited, however, to combined mechanical agitation and special aeration, as either method alone may be employed.

If it is decided to continue the heat during the flotation, steam may be used to agitate, aerate and heat the mixture. Water, air, steam, or combination jets, including oil jets, may be utilized to agitate and produce froth. The amount of agitation and aeration should be adjusted to suit the quantity of water, coal and oil used. In general, with air introduced into the pulp and mechanical stirring, the resulting agitation need not be as violent as when a small amount of oil under 1% of the weight of material treated is used. The speed of rotation of blades used in most mineral flotation installations is about 1500 R. P. M. Such speeds are higher than needed in this process. For present purposes it is not necessary that a persistent froth be obtained. While there are more coal particles and greater amounts of material floated in the case of coal than mineral particles in ore flotation, the specific gravity of coal is from 1.2 to 1.8, while sulfids of metal have a gravity around 5.0. Froment states that "the rapidity of the formation of the spherules and their ascension is in direct ratio to the quantity of gas produced in a given time." It is not essential that the amount of air introduced in coal flotation be as great as in mineral ore flotation, if combined mechanical stirring and aeration are employed. When a Callow cell alone is used in minerals separation about 80 cubic feet of air per cell per minute, under 5½ pounds pressure, is satisfactory. The amount and pressure of air may be reduced in the process in view of the mechanical stirring. Considerable air, however, is needed as the quantity of coal particles is large and the total weight of coal to be floated from a ton of material treated is important.

The impurities in the coal separate out from the froth, because water wets the bulk of the ash but not the coal. The latest research indicates that particles in the froth are carried between two oil films in the outer coating of an air bubble and the particles are not in contact either with the air inside the bubble or outside of it. In the case of peptized coal the particles are believed to carry oil or air adsorbed and occluded within it while the particles themselves are within the two oil films. The ability of charcoal to take up gases, alcohol and fusel oil is known. The ability of coal to occlude or adsorb certain liquid hydrocarbons and other substances is considered somewhat analogous thereto.

The third step of the process brings out a basic difference in flotation procedure. In the metallurgical process the froth is destroyed by various means after the gangue has settled. Resort is had to continuous or intermittent thickening of the concentrate, or to froth breaking by the use of centrifugal pumps, bucket elevators, tables, or water or steam jets. Since oil is used to the least extent possible therein it has never been employed intentionally to destroy froth. But even a small quantity of oil freely added to the froth will sufficiently and rapidly destroy the most persistent froth. Heretofore engineers have been warned to avoid allowing oil to come in contact with the froth. ("Froths formed by floatation oils," W. A. Muller, *Engineering and Mining Journal*, 1916, volume 102, page 31). This property of free oil is not a new discovery, but its intentional utilization in a flotation process is considered so. An explanation of the phenomenon may lie in the attraction of bodies of certain oils to each other, so that the bubbles are broken by the mere presence of free oil available to combine with the oil around the bubbles. In the combined de-ashing and colloidalizing fuel manufacturing process, since more oil is to be added to the coal to make a liquid or mobile fuel after flotation, it is quite acceptable to utilize some oil at this juncture to destroy froth. The froth is therefore sprayed or bathed with enough oil of suitable character until it disappears, leaving a mixture of coal, oil and water, more or less paste-like or liquid depending upon the kind and amount of oil added. An oil of flash point over the boiling point of water is preferred, but this quality is not vital.

Since water lowers the thermal value of fuel in which it is found, it would not be economic to remove ash only to leave the fuel burdened with water. Froth may be dehydrated before destruction, or during it, or water may be removed from the destroyed froth. It is usually desirable to partially dehydrate the mixture left from the destroyed froth. Froth contains up to 30% of water, so the importance of this dehydration step is apparent. Water may be removed by evaporation or otherwise. The dehydration is more easily accomplished in the present case than in the case of minerals separation as in the latter process there is no easy way to destroy froth and dehydration is linked therein with froth destruction. In minerals separation filtering is usually combined with thickening and classifying, but evaporation is also often used. In a tank the mineral concentrate in contact with steam pipes is quickly dried but the moisture is driven out only to condense on the main body of the concentrate, still partially frothy, which dries very slowly. It is possible to avoid these inconveniences with coal flotation and colloidalizing inasmuch as the froth may be adequately destroyed by addition of oil. The coil-oil-water mixture may be passed in a thin layer over a hot plate. The heat of the plate should be well over the boiling point of water so as to rapidly dehydrate the mixture during its brief passage over the plate. The heat of the plate also advances the peptization of the coal and the intimacy of the coal-oil mixture. As there need be no adjacent froth for the steam to condense upon, the dehydration may be rapid and permanent. By dehydration is meant partial or complete water removal. It is, of course, entirely possible to dehydrate in other ways, but the manner indicated is peculiarly fitted to the process described and is representative of this process step.

The dehydrated liquid or paste is finally carried into a mixing vessel where the remainder of the oil to produce the fuel is added and colloidalizing is completed. The final oil may be one variety or a blend of several. If all the oil has been added before dehydration, then no further oil need be employed at this stage. To carry high percentages of coal in a liquid fuel the dispersion medium may advantageously have or be given a viscosity of about 20° Engler at 20° C., but other viscosities will serve. If the viscosity is lower stability may be less, if higher the fuel may approach a paste in consistency. Further solid particles may be added at this stage if desired. If the coal needs further reduction to facilitate stabilization, the mixing vessel may be a pulverizing mill, otherwise an ordinary stirring apparatus will suffice. Further heat or more peptizing substance may be required to bring the peptization to the degree desired for stabilization. If such is the case, the peptizer should be added when the froth is destroyed or when the mixture is in the mixing vessel, but heat may be applied during the described steps of the process or afterward in storage. The dispersion medium should not contain such an amount of peptizer as will over-peptize the coal. In the mixing vessel the coal-oil mixture is agitated, with or without heat, until thoroughly homogenized and stabilized. By "homogenized" is meant commingled with or without heat to the extent required for stability. Usually a few moments' agitation will suffice.

If some stabilizing fixateur is added to the mixture after flotation, no further heat or less heat will be required. It has been found that soap in certain quantities is not injurious to flotation and may partially replace oil. After flotation soap may be usefully added to assist stability. It is desirable in flotation to slightly acidify the water to promote the affinity of the oil to the coal or of the water to the ash. It has been found in recent flotation development that alkali will also so serve. As the fuel made without flotation is slightly alkaline, it is not strictly necessary to reduce acidity in the case of the fuel made with flotation. There is no fuel disadvantage, however, in so doing, and alkaline substance in small amount may be added if desired. Saponification to some extent assisting stability may result.

It is useful to point out the novel aspects of the combined flotation and colloidalizing method. The flotation process has become chiefly familiar in relation to the separation of minerals from gangue. The recent discovery of the method of stabilizing particles in oil has paved the way for an extension of flotation in a new direction, since no longer need oil be separated from the coal or a solid product formed. The preferred process is not a mere sequence of two distinct processes. Stabilization treatment of the particles of coal begins before flotation, proceeds during it and finishes after it. The flotation oil is used for flotation and also for peptization. The coal is ground with the peptizer and heated. A percentage of oil over 1% of the material treated is probably employed and there is no critical amount of oil involved. Peptization changes the surface of the coal to the advantage of stability without prejudice to flotation for liquid fuel purposes. The froth need not be a persistent one and the agitation to produce it need not be violent nor limited to beating in air by mechanical means. The intentional destruction of froth by the addition of oil to it is quite unprecedented as a flotation-process step and feature. The subsequent dehydration and blending of the dehydrated coal and oil composite with further oil or coal or both to make a stable liquid or mobile fuel heavier than water are both advances in the flotation and colloidalizing arts. The greater part of the material treated is recovered in purified form in the froth and concentrate, while the impurities form a smaller proportion of the material treated. Also the greater part of the carbon content of the material treated is recovered in the froth. On the contrary, in minerals separation a small amount of mineral is recovered from the main body of gangue. The present process differs manifestly and basically, therefore, from previous flotation processes.

It is intended to cover broadly the combination of flotation and colloidalizing. The procedure may be varied within wide limits without departing from the fundamentals of the method. Further steps may be added. For instance, the viscosity of the oil added in the mill or mixing vessel may be adjusted to prepare it so that the body of liquid will eventually carry in stable suspense the desired burden of coal particles. Stabilization may be promoted in the final mixing vessel by the addition of buoyant substance or fillers. The fuel may be centrifuged to divide it into two varieties, a paste containing mostly suspension-sized particles and a liquid containing many colloidal and molecular particles. The possibility of adding to the process further steps for special purposes is expressly contemplated; for example the reduction of the sulfur content of the coal or oil by electrolytic or chemical means or both.

Figure 1:
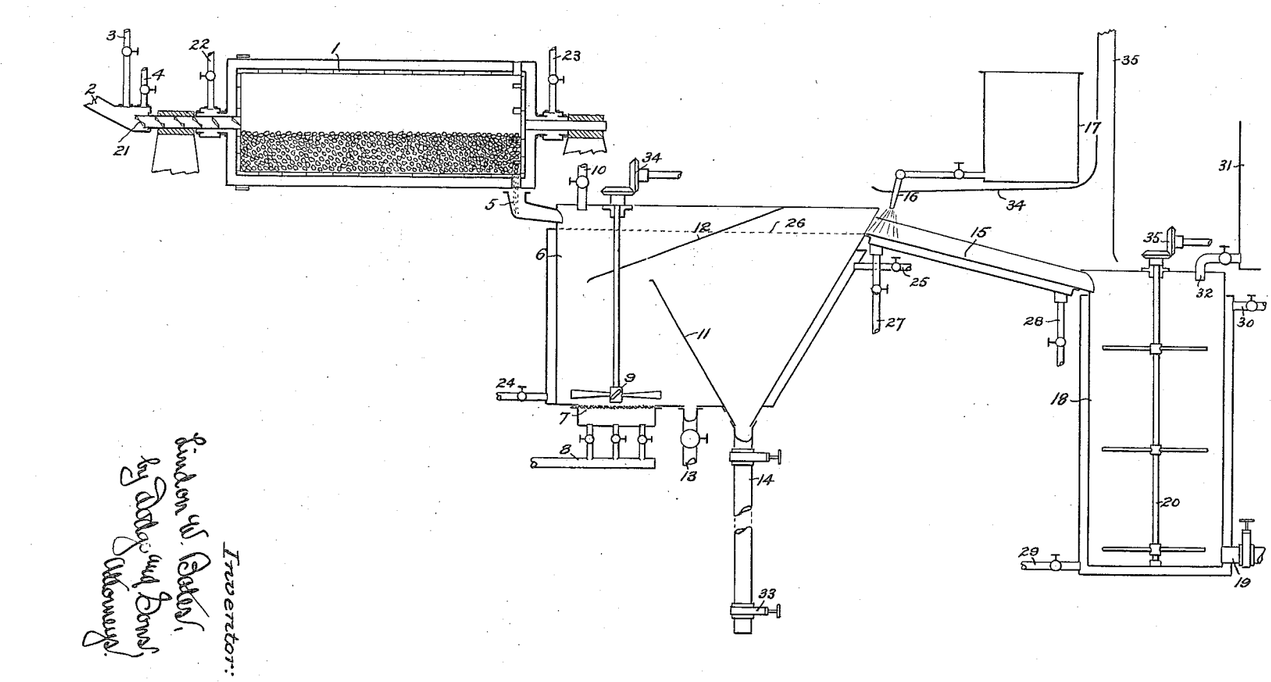

The following apparatus is suitable to carry out the process described herein. The figure is diagrammatic and is a view of a vertical cross section of a plant to carry out the process. A Smidth coal pulverizing mill 1 is shown since it is especially useful for wet grinding. Other types of mills may be employed. The coal is admitted through pipe 2, flotation oil through 3, and small amounts of other liquid may be admitted through pipe 4. A hot water or steam jacket or box surrounds the mill, and the heating liquid, vapor or gas is admitted through pipe 22 and leaves through 23. A screw conveyer 21 carries the mixture into the mill. The pulverized coal with its associated oil, passes from the pulverizing mill through pipe 5 and is admitted into the agitation vessel 6. A centrifuge may be interposed. The vessel 6 contains an agitator 9 having several blades. It is rotated in any convenient manner from 34. At the base of the vessel is suitably mounted a canvas screen 7 in such a fashion that it serves as a bottom for the container preventing the escape of the water with which the vessel is partially filled. The canvas bottom is prevented from bulging by a wire or other screen. Underneath the canvas are located orifices 8 through which air under compression is forced. The air passes through the canvas inasmuch as the canvas and the orifices are within a box preventing the escape of air in any direction save through the canvas. Water is admitted to the vessel from pipe 10. Inside the agitating vessel are located two baffle plates 11 and 12. The one, 12, is located at such an angle that the froth formed by the agitation is carried to the right and directed toward the top. The other, 11, forms a side of a spitzkasten section of the agitating vessel to catch ash falling from the froth. At the bottom of the agitation section is located a pipe 13 and of the spitzkasten section a pipe 14. The ash may be removed from the agitating vessel through these outlets. Valve 33 enables ash to be removed without allowing the escape of the body of water from the vessel. The agitating vessel is surrounded by a hot water or steam jacket into which the heating liquid, vapor or gas is admitted through pipe 24 and leaves through 25. The froth passes from the top of the water in the agitation section to the top of the water in the spitzkasten section. The water in the agitating vessel is usually continuously admitted and removed so as to keep it in slow circulation from the agitation section to the spitzkasten section in such a fashion as to assist the passage of the froth from the one section into the other. The agitating vessel is surrounded by a launder 26. The froth passes over a lip of the spitzkasten section onto a launder 15 which is set at an inclination of about 15° so that the froth tends to flow downward.

The launder 15 is maintained at a high temperature, above the boiling point of water, and forms a hot plate. Water or steam is admitted into a jacket located adjacent to its bottom surface through pipe 27 and leaves through 28. Tank 17 contains oil which is conveyed to a jet or valve 16 which admits a sufficient quantity of oil to the top surface of the froth as it passes from the spitzkasten onto the launder. This oil kills the froth and assists the flow of the mixture down the launder. On passing over the launder some water content is evaporated. The launder is covered by a hood 34 having a funnel 35. The vapors may be subsequently condensed. A fan may draw off the vapors unless natural draft suffices to do so. The mixture upon reaching the base of the launder passes over a lip into a mixing vessel 18.

Further oil is admitted from tank 31, through pipe 32 into this vessel. The components are intimately mixed by the agitating effect of a suitable stirring mechanism 20 driven from 35. The mixing vessel is also surrounded by a hot water or steam jacket into which the heating vapor or water enters through pipe 29 and leaves through 30. The final mixing vessel is called a mixing vessel to distinguish it from the agitating vessel used in the flotation part of the process. The completely manufactured fuel is removed from the vessel through pipe 19 in any suitable manner by pumping or gravity flow.

This apparatus combination is clearly typical only of a suitable installation to carry out the process. The mechanical means employed to simultaneously remove ash and colloidalize carbonaceous substance to form a stable mobile fuel may be considerably varied to meet special conditions. The degree of heat specifically mentioned in certain of the claims is to be interpreted as approximate only. If the mill or pulverizing elements are heated the heat treatment will be applied to the materials in the mill. The use of oil heated in advance is not excluded, but the application of heat by the mill or mixing vessel is the most practical way of applying the heat treatment. Froth may be destroyed by oil or by other known methods, or by a combination thereof. A greater fineness than 85% through 200 mesh is useful for the coal particles in the fuel but is not essential. The said percentage is approximate and to give an indication of suitable size. Minor details, such as the possible removal of the froth from the water by manual or mechanical means and scraping of the hotplate, are sufficiently obvious not to require explanation herein. The word "colloidalizing" is used not because the fuel is a true colloid, but because of its colloid-like characteristics, such as stability and Brownian movement.

It is of course entirely practical to utilize the purified paste to form briquets instead of a liquid fuel, since the peptizing liquid hydrocarbon used for flotation may also serve as a binding substance with other components to form a briquet. But the present process takes a different direction. The process utilizes the poorer grades of carbonaceous substances containing ash, removes a material part of the ash therefrom, and employs the so purified particles of carbonaceous substances with the flotation oil which acts to peptize and further liquid hydrocarbon to form a stable mobile fuel heavier than water which is now comparatively free from ash since ash has been removed from an important component by flotation.

Having thus stated the nature of my invention what I claim is:

1. A stable mobile fuel consisting essentially of a homogenized admixture of a relatively large quantity of de-ashed, peptized, pulverized solid carbonaceous substance and liquid hydrocarbon.

2. A stable mobile fuel containing liquid hydrocarbon and particles of peptized de-ashed solid carbonaceous substance, said particles being in the main above colloidal limits in size.

3. A stable mobile fuel comprising a homogenized admixture of liquid hydrocarbon and particles of washed, de-ashed and peptized solid carbonaceous substance.

4. A stable mobile fuel containing liquid hydrocarbon, particles of de-ashed solid carbonaceous substance, said particles being in the main above colloidal limits in size, and coal distillate.

5. A stable mobile fuel containing liquid hydrocarbon, particles of de-ashed solid carbonaceous substance, a product with resinous acid having stabilizing qualities, and coal distillate having peptizing qualities.

6. A stable mobile fuel heavier than water comprising a homogenized admixture of liquid hydrocarbon and particles of de-ashed and peptized solid carbonaceous substance.

7. A stable mobile fuel heavier than water comprising a homogenized admixture of liquid hydrocarbon, particles of de-ashed and peptized solid carbonaceous substance, and a small amount of lime-rosin grease.

8. A mobile fuel of improved stability comprising finely divided de-ashed solid carbonaceous substance, liquid hydrocarbon, and a small amount of alkaline substance saponified therewith.

9. A mobile fuel of improved stability comprising finely divided de-ashed solid carbonaceous substance, mineral oil, coal distillate, and a small amount of alkaline substance saponified therewith.

10. That step in the method of producing a stable mobile fuel from particles of solid carbonaceous substance substantially free from ash, and a saponifiable liquid hydrocarbon, which consists in saponifying therewith before the separation of ash, a small amount of alkaline substance, 11. That method of producing a stable mobile fuel comparatively free from ash, which consists in removing ash by flotation from pulverized solid carbonaceous substance containing ash, and stabilizing the particles of purified substance in liquid hydrocarbon; stabilization being initiated before flotation is terminated.

12. That method of producing a stable mobile fuel comparatively free from ash, which consists in separating ash from pulverized solid carbonaceous substance containing ash by utilizing in water the preferential affinity of liquid hydrocarbon for carbonaceous particles, and stabilizing the particles of purified substance in liquid hydrocarbon; stabilization being initiated before flotation is terminated.

13. That method of producing a stable mobile fuel comparatively free from ash, which consists in separating ash from pulverized solid carbonaceous substance containing ash by utilizing in water the preferential affinity of liquid hydrocarbon for carbonaceous particles, and commingling the particles of purified substance in liquid hydrocarbon with stabilizing substance added thereto before the separation of ash.

14. That method of producing a stable mobile fuel comparatively free from ash, which consists in separating ash from pulverized solid carbonaceous substance containing ash by utilizing in water the preferential affinity of liquid hydrocarbon for carbonaceous particles, and stabilizing the particles of purified substance in liquid hydrocarbon by peptization initiated before flotation.

15. That method of producing a stable mobile fuel comparatively free from ash, which consists in removing ash from heated and pulverized solid carbonaceous substance containing ash with liquid hydrocarbon having a peptizing effect upon it by forming in water a froth which floats carbonaceous particles and from which ash separates, and commingling the purified substance with further liquid hydrocarbon.

16. That method of producing a stable mobile fuel comparatively free from ash, which consists in removing ash by flotation from solid carbonaceous substance containing ash pulverized and peptized with peptizing, frothing and collecting liquid hydrocarbon, and commingling the purified substance with further liquid hydrocarbon.

17. That method of producing a stable mobile fuel comparatively free from ash, which consists in removing ash by flotation from solid carbonaceous substance containing ash pulverized so that 85% would pass a 200 mesh screen and heated to between 65° C. and 95° C. with flotation liquid hydrocarbon having peptizing qualities to initiate fuel stability before flotation is terminated, and commingling the purified substance with further liquid hydrocarbon after flotation.

18. That method of producing a stable mobile fuel comparatively free from ash, which consists in removing ash from solid carbonaceous substance containing ash pulverized so that 85% would pass a 200 mesh screen and heated to between 65° C. and 95° C. with flotation liquid hydrocarbon having peptizing qualities to initiate fuel stability before flotation is terminated by forming in water a froth from which ash separates, destroying the froth, and commingling the purified substance with further liquid hydrocarbon after flotation.

19. That method of producing a stable mobile fuel comparatively free from ash, which consists in pulverizing solid carbonaceous substance containing ash in liquid hydrocarbon having peptizing qualities and heating the same to advance peptization, forming in water a froth containing carbonaceous particles from which ash separates, removing the froth, destroying the froth by adding oil thereto, and homogenizing the mixture with further liquid hydrocarbon.

20. That method of producing a stable mobile fuel comparatively free from ash, which consists in pulverizing solid carbonaceous substance containing ash in liquid hydrocarbon having peptizing qualities and heating the same to advance peptization, forming in water a froth containing carbonaceous particles from which ash separates, removing the froth, destroying the froth, dehydrating the mixture and homogenizing the mixture with further liquid hydrocarbon.

21. That method of producing a stable mobile fuel comparatively free from ash, which consists in removing ash by flotation from solid carbonaceous substance containing ash when pulverized so that 85% would pass a 200 mesh screen and heated to between 65° C. and 95° C. by forming in water with flotation liquid hydrocarbon having peptizing qualities to promote fuel stability before flotation proceeds a froth from which ash separates, removing the froth, destroying the froth by the addition of liquid hydrocarbon thereto, dehydrating the mixture by evaporation, and commingling the purified substance with liquid hydrocarbon.

22. That method of producing a stable mobile fuel comparatively free from ash, which comprises pulverizing solid carbonaceous substance containing ash in peptizing liquid hydrocarbon and heating the same while so pulverizing, removing the ash by the formation in water of froth which floats carbonaceous particles from which ash separates, removing the froth from the surface of the water, destroying the froth by the addition of oil thereto, removing water from the mixture, and blending the mixture with further liquid hydrocarbon until the carbonaceous particles are stabilized and a mobile fuel is produced.

23. That method of producing a stable mobile fuel comparatively free from ash, which consists in reducing solid carbonaceous substance containing ash to the form of particles and peptizing them in liquid hydrocarbon having peptizing qualities, and while so doing heating the mixture, thereupon agitating the mixture in hot water until a froth containing carbonaceous particles is made and ash separates upon froth flotation, removing the froth and destroying it by the addition of liquid hydrocarbon thereto, heating the mixture to evaporate water, and blending the mixture until a stable mobile fuel is produced.

24. That method of producing a stable mobile fuel comparatively free from ash, which consists in pulverizing solid carbonaceous substance containing ash to a size such that 85% would pass through a 200 mesh screen in an amount of flotation oil including coal distillate totaling over 1% of weight of material treated and while so doing heating the mixture to between 65° C. and 95° C., agitating the mixture mechanically and with aeration in a body of water which is heated and slightly acidulated until a froth containing carbonaceous particles forms upon the upper surface of the water from which ash separates, removing the froth and destroying it by pouring liquid hydrocarbon thereon, dehydrating the mixture by evaporation, and agitating the mixture with heat until a stable mobile fuel is produced.

25. That method of producing a stable mobile fuel comparatively free from ash, which consists in mixing and peptizing pulverized solid carbonaceous substance containing ash with froth-forming substance having peptizing qualities upon and a preferential affinity for carbonaceous particles, agitating the mixture in a body of hot acidulated water so that a froth is formed containing carbonaceous particles, separating the ash by flotation, destroying the froth, dehydrating the mixture and commingling therewith liquid hydrocarbon until a mobile fuel is produced.

26. That method of producing a stable mobile fuel comparatively free from ash, which consists in mixing and heating pulverized solid carbonaceous substance containing ash with coal distillate having peptizing qualities which operate upon it, agitating the mixture so that a froth is formed carrying carbonaceous substance, distributing the froth on the surface of a current of water running over columns of water so that ash deposits out while the froth is floated away by the current, removing the froth, destroying it by the addition of oil thereto, dehydrating the mixture by evaporation and mixing liquid hydrocarbon and stabilizing substance therewith until a stable mobile fuel is produced.

27. That method of producing a stable mobile fuel comparatively free from ash, which comprises pulverizing solid carbonaceous substance containing ash in liquid hydrocarbon having peptizing qualities and heating the mixture while so pulverizing, whereby the particles are peptized, removing some of the liquid hydrocarbons, passing the pulp into a vessel filled with water and agitating and aerating the mixture sufficiently therein to form a froth from which ash separates, passing the froth onto a launder heated above the boiling point of water upon which the froth is destroyed by the addition of oil thereto and from which the water is evaporated, passing the dehydrated mixture into a mixing vessel where further oil is added and the components are blended by agitation and heat treatment into a stable mobile fuel.

28. That method of producing a stable mobile fuel comparatively free from ash, which comprises reducing solid carbonaceous substance containing ash to the form of particles in the presence of liquid hydrocarbon having peptizing qualities and while so pulverizing heating the mixture to a temperature between 65° C. and 95° C., removing some of the liquid hydrocarbon, passing the pulp into a vessel filled with hot acidulated water and agitating and aerating the mixture sufficiently therein to form a froth from which ash separates, passing the froth onto a launder where it is destroyed by the addition of oil thereto and where water is evaporated from the mixture by heat in sufficient degree, passing the dehydrated mixture into a mixing vessel where the components are blended with further liquid hydrocarbon by mechanical and heat treatment into a stable mobile fuel.

29. That method of producing a stable mobile fuel comparatively free from ash, which comprises reducing solid carbonaceous substance containing ash to the form of particles in the presence of liquid hydrocarbon having peptizing qualities and while so pulverizing heating the mixture to a temperature between 65° C. and 95° C., removing some of the liquid hydrocarbon by centrifuging, passing the pulp into a vessel filled with water slightly acidulated and agitating and aerating the mixture sufficiently therein to form a froth from which ash separates, passing the froth onto a launder where it is destroyed by the addition of oil thereto and where water is evaporated from the mixture by heat in sufficient degree, passing the dehydrated mixture into a mixing vessel where further oil and substance which with liquid hydrocarbon operates to stabilize the particles are added and where the components are blended by mechanical and heat treatment into a stable mobile fuel.

30. That method of producing a stable mobile fuel comparatively free from ash, which comprises reducing solid carbonaceous substance containing ash to the form of particles in the presence of liquid hydrocarbon having peptizing qualities which operate upon them, passing the pulp into a vessel filled with water and agitating the mixture in such a manner as to form a froth from which ash separates, passing the froth onto a launder where the froth is destroyed by the addition of oil thereto and where water is evaporated from the mixture with heat, passing the dehydrated mixture into a vessel where further oil and lime-rosin soap are added and the components are blended into a stable mobile fuel.

In testimony whereof I have signed my name to this specification.

LINDON WALLACE BATES.